US012673882B2

(12) United States Patent
Magg

(10) Patent No.: US 12,673,882 B2
(45) Date of Patent: Jul. 7, 2026

(54) APPARATUS FOR STERILIZING A LIQUID

(71) Applicant: OSRAM GMBH, Munich (DE)

(72) Inventor: Norbert Magg, Berlin (DE)

(73) Assignee: OSRAM GmbH, Munich (DE)

( * ) Notice: Subject to any disclaimer, the term of this patent is extended or adjusted under 35 U.S.C. 154(b) by 1076 days.

(21) Appl. No.: 17/718,010

(22) Filed: Apr. 11, 2022

(65) Prior Publication Data

US 2022/0324727 A1      Oct. 13, 2022

(30) Foreign Application Priority Data

Apr. 12, 2021   (DE) ..................... 10 2021 203 590.6

(51) Int. Cl.
C02F 1/32        (2023.01)
A47L 15/42       (2006.01)

(52) U.S. Cl.
CPC ........... C02F 1/325 (2013.01); A47L 15/4242 (2013.01); C02F 2201/3222 (2013.01); C02F 2201/3227 (2013.01); C02F 2303/04 (2013.01); C02F 2305/10 (2013.01); C02F 2307/12 (2013.01)

(58) Field of Classification Search
CPC ...... A61L 2202/122; A61L 2/10; C02F 1/325; C02F 2201/3222
See application file for complete search history.

(56) References Cited

U.S. PATENT DOCUMENTS

| | | | | |
|---|---|---|---|---|
| 2019/0263680 A1* | 8/2019 | Dobrinsky | ................ | A61L 2/24 |
| 2019/0274421 A1* | 9/2019 | Cosolito | ............. | A46B 17/065 |
| 2020/0140292 A1* | 5/2020 | Schowalter | .............. | A61L 2/26 |
| 2021/0032142 A1* | 2/2021 | Ramsey | ................. | C02F 1/482 |

FOREIGN PATENT DOCUMENTS

| | | | | |
|---|---|---|---|---|
| AT | 54706 B | 8/1912 | | |
| DE | 19901058 A1 | 7/2000 | | |
| FR | 2760445 A1 | 9/1998 | | |
| GB | 191014127 A | 4/1911 | | |
| JP | 2001334263 A | 12/2001 | | |
| KR | 20200041195 A * | 10/2018 | ............. | C02F 1/325 |
| KR | 101999502 B1 * | 7/2019 | ............... | C02F 1/78 |
| KR | 102221730 B1 * | 3/2021 | ......... | B01F 25/3121 |
| WO | WO-2007079749 A1 * | 7/2007 | ......... | B01J 19/0066 |

(Continued)

OTHER PUBLICATIONS

KR_20000072137_A_translation (Year: 2000).*
(Continued)

*Primary Examiner* — Elizabeth A Robinson
*Assistant Examiner* — Changru Chen
(74) *Attorney, Agent, or Firm* — ArentFox Schiff LLP

(57) ABSTRACT

An apparatus for sterilizing a liquid comprises a container having an inlet, an outlet and an interior with an outer wall which defines a first section and a second section, the first section being configured to receive the liquid. A rotatable arrangement set up in the interior with a surface is furthermore provided, the rotatable arrangement being configured in such a way that during a rotation the surface moves from the first section into the second section and from there back into the first section. The apparatus furthermore comprises at least one radiation source which is adapted to emit radiation in the ultraviolet wavelength range.

18 Claims, 5 Drawing Sheets

(56) References Cited

FOREIGN PATENT DOCUMENTS

| WO | WO-2010021139 A1 * | 2/2010 | ........... A61L 2/0094 |
| WO | WO-2017043355 A1 * | 3/2017 | ........... A61L 2/0047 |
| WO | WO-2017043356 A1 * | 3/2017 | ............... A61L 2/10 |

OTHER PUBLICATIONS

JP_2001334263_A_translation (Year: 2001).*
KR_20200041195_A_translation (Year: 2020).*
KR_102221730_B1_translation (Year: 2021).*
WO 2017043355 A1 Translation (Year: 2017).*
WO 2017043356 A1 Translation (Year: 2017).*
WO 2010021139 A1 Translation (Year: 2010).*
KR 101999502 B1 Translation (Year: 2019).*

\* cited by examiner

APPARATUS FOR STERILIZING A LIQUID

This application claims priority to German Patent Application No. 10 2021 203 590.6, filed Apr. 12, 2021, which is hereby incorporated by reference herein.

TECHNICAL FIELD

Aspects and exemplary embodiments relate to an apparatus for sterilizing a liquid, which comprises a container for receiving the liquid with an outer wall enclosing an interior, and at least one radiation source which is configured to emit radiation with wavelengths in the range of UV radiation, in particular UV-C radiation, through the outer wall of the container or from a corresponding position close to the outer wall into an interior of the container, in order to irradiate the liquid received therein. Such apparatuses are also referred to as UV reactors.

PRIOR ART

It is known to use UV reactors in order to treat drinking water or for the sterilization of service water in dishwashers, etc. By the UV radiation acting on the liquid in question, microorganisms, in particular viruses, bacteria or fungi, contained therein can be inactivated. By the UV radiation, the corresponding germs are in this case either directly killed or at least damaged in respect of their DNA and therefore prevented from replicating. Particularly effective in this case is found to be radiation in the wavelength range of from 200 nm to 280 nm, which according to DIN 5031-7 is also referred to as far-UV radiation, as well as the adjacent range of from 100 nm 200 nm, which is correspondingly referred to as vacuum-UV radiation. Furthermore, UV radiation in the range of from 249 nm to 338 nm is effective against bacteria on biofilms, the wavelength range of between 292 nm and 306 nm being distinguished by a particularly high efficacy, with an efficacy maximum at 296 nm. Biofilms are included here under the category of non-liquid fluids. Radiation with this wavelength is absorbed in the Earth's atmosphere, so that most microorganisms have not formed resistance against it. DNA absorbs radiation particularly at a maximum which lies between about 260 and 270 nm. The aforementioned wavelength ranges are combined as UV-C radiation and are predominantly used in UV reactors. For the purposes of this application, the range of from 10 nm to 121 nm (extreme ultraviolet) is also included by the term UV-C radiation.

Conventionally, in particular low-pressure mercury lamps with characteristic emission at about 253.7 nm have also previously been used for this purpose. These have certain disadvantages, however, for example increased degradation within the first 500 operating hours and an average lifetime of only 8000 operating hours, as well as the requirement of an AC voltage source for operation or increased disposal costs because of the mercury used. Furthermore, low-pressure mercury lamps have the disadvantage of needing a relatively large installation space and disposal of the phosphor is problematic because of the use of mercury. In addition, low-pressure mercury lamps have significant restrictions when involved with applications in which rapid ON/OFF switching cycles are necessary.

In contrast, LEDs emitting radiation in the UV-C wavelength range have recently also been used increasingly for the sterilization of fluids. Although the service lives may be more than 10000 hours, the so-called wall plug efficiency (radiation emitted per unit of energy used) of LEDs in the UV-C range is currently much less than those of low-pressure mercury lamps or other UV lamps (for example about 3% as opposed to 30% to 50%), the efficiency decreasing even more dramatically toward shorter wavelengths, even though advances continue to be achieved.

One problem, particularly in the disinfection of extremely turbid liquids, for instance in dishwashers, etc., is the significant attenuation of the UV radiation used for the disinfection in the liquid to be disinfected. Even regular drinking water can lead to a significant reduction in the transmission as a function of the layer thickness. In the case of even more polluted wastewater, it is to be expected that the radiation intensity will already have fallen to 10% of the initial value with a layer thickness of 5 mm.

In the prior art, it is therefore proposed on the one hand to make the radiation power so high that a sufficient reduction of the bioburden is achieved in all regions to be disinfected of the liquid, for example a reduction of the colony forming units (CFU) by a factor of more than $10^{-5}$ or even more than $10^{-6}$.

With this approach, however, an energy efficiency of a system based on UV overdosing in a predominant part of the irradiated region is greatly reduced. If LEDs are used as UV light sources, on the other hand, this approach may scarcely be envisioned anyway because of the limited maximum amounts of UV radiation.

As an alternative, it has been proposed to reduce the thickness of the liquid layer through which radiation takes place, for example by reducing the reactor diameter or by suitably defining a flat liquid level on a surface to be irradiated. This, however, requires an increase in the flow rate in order not to suffer from losses of throughput per unit of time. The action time is reduced in this way, however, which in turn leads to insufficient sterilization.

Document U.S. Pat. No. 5,626,768 A discloses an apparatus for inactivating or killing bacteria in an opaque liquid by means of UV radiation. The device comprises a cuboid box having an inlet and an outlet, as well as 8 planar excimer radiators arranged mutually parallel therein at a spacing of 2 cm and having dimensions of 30 inches (about 76.2 cm) in length by 30 inches (about 76.2 cm) in width by 0.5 inches (about 1.27 cm) in thickness. The excimer radiators are fixed alternately on mutually opposite walls of the box so that a flow path, referred to in the document as "serpentine", is formed between them with a total length of 240 inches (about 6.09 m), which is irradiated on both sides by the excimer radiators with UV radiation having a wavelength of 282 nm with a radiant exitance of 125 mW/cm$^2$. With the spacing given, this radiation is not sufficient to fully penetrate the opaque liquid. However, the flow speed is set sufficiently high to cause mixing by the turbulence thereby formed so that, over the total length of the flow route, all bacteria come close to the surface of the excimer radiators and are killed. Furthermore, single or multiple recirculation from the outlet back to the inlet is provided in order to further improve the disinfection outcome.

Document JP 2000-288559 A discloses a wastewater treatment apparatus. Wastewater, to which hydrogen peroxide is added, is supplied to an overflow container by means of a pump. Via an overflow, the wastewater reaches a flat, substantially horizontal, laterally bounded flow route surface with a length of 30 cm and a width of 20 cm, on which the wastewater spreads out and forms an approximately 10 mm thick liquid film that moves in the direction of a collection container. The thickness of the liquid film is controlled by means of the delivery into and out from the overflow container. A number of UV lamps are positioned above the flow route surface and a domed reflector is positioned above the latter, which together emit UV radiation with a wavelength of less than 254 nm with a radiant exitance of 123 W/m$^2$ in the direction of the liquid film. Because of the UV radiation, the hydrogen peroxide reacts to form hydroxyl radicals which in turn aggressively oxidize organic substances in the wastewater.

Document U.S. Pat. No. 5,069,885 A discloses an apparatus for photocatalytically purifying liquids, which may in particular be laden with pollutants such as trihalomethanes, polychlorinated biphenyls (PCB), pesticides, benzene derivatives. The apparatus comprises a cylindrical casing having an inlet and an outlet, and a spiral coil which is introduced into the interior of the casing, externally ends in a leaktight fashion with the casing wall and internally ends with a transparent sleeve, extending along the cylinder axis, in which a UV lamp is arranged. The spiral coil forms a helical channel in the casing, which winds around the sleeve with the UV lamp from the inlet to the outlet and is internally irradiated by the UV lamp. The surface of the substrate of the spiral coil is coated with photoreactive material, for instance titanium oxide. The irradiation with UV light leads to the destruction of organic components in the liquid, which reach the surface by turbulence during the flow.

The older document GB 191014127 A from the year 1910 describes an arrangement for sterilizing liquids, in which a liquid is fed from a storage container into a tank so that a liquid level is formed therein. A roller is mounted rotatably in the tank, a part of the substantially smooth surface of the roller being located below the liquid level and therefore being immersed in the liquid. During a rotation of the roller, the surface entrains a thin liquid film when emerging from the liquid because of the surface tension of the liquid. Above the roller, there is a mercury-quartz lamp with a reflector, which directs UV radiation onto the surface of the roller with the liquid film and sterilizes the latter. Before re-immersion of the relevant part of the surface, the liquid film is taken off by a wiper and fed onto the surface of a subsequent roller in a cascade of rollers, where the irradiation with UV light is continued. A final wiper in the cascade allows the sterilized liquid to be filled, for example into bottles.

In the proposals above, attempts are made to expose the liquid to be disinfected as a quasi-two-dimensional layer to the UV radiation. In this case, however, a disadvantageous effect is always that occasionally bulky, sometimes even open constructions hinder miniaturization and at the same time still suffer from low flow quantities. Use, for example, in modern automatic washing machines or dishwashers is therefore extremely difficult.

DESCRIPTION OF VARIOUS ASPECTS

It is therefore an object to provide an apparatus for sterilizing a liquid, with which a high throughput of sufficiently disinfected liquid is achieved with little installation space. It is also an object to provide a corresponding method.

The object is achieved by an apparatus for sterilizing a liquid having the features of patent claim 1. The dependent claims relate to advantageous refinements of the apparatus according to the invention.

The starting point is an apparatus for sterilizing a liquid, which comprises a container having an inlet, an outlet and an interior with an outer wall. The outer wall of the interior defines a first section and a second section in the interior. The first section is configured to receive the liquid when it is admitted through the inlet. The second section forms a subregion of the interior above the first section. The term "above" refers here in particular to the respectively applicable direction of gravity. The liquid admitted through the inlet during operation can in any case fill the lower subregion of the interior. Preferably, the inlet and outlet open directly into the first section. At least the inlet may, however, also lie above the first section. During operation, the second section may preferably be filled with air or a suitable gas. It is advantageous in this case for the UV radiation coupled into this second section to be scarcely attenuated by the medium spreading therein.

A rotatable arrangement is set up in the interior. The rotatable arrangement has a surface. The rotatable arrangement is configured in such a way that the surface can rotate in the interior and, during a rotation, can move from the first section into the second section and from there back into the first section. The surface comprises three-dimensional structuring, which is formed in such a way that it can entrain a liquid film and/or small liquid portions with it when it is immersed into and emerges from the liquid admitted into the first section. Preferably, the second section is adapted so that it may also be filled with air, gas or vacuum during operation. This may, for example, be achieved either in that the liquid cannot displace the air contained in the second section or the relevant gas for lack of an outlet being present there, or for example in that the liquid feed and discharge are controlled in such a way that a liquid level which remains in the first section is set up.

The three-dimensional structuring involves on the one hand an increase in the surface area in comparison with a smooth surface, for instance as proposed in GB 191014127 A which was mentioned in the introduction. According to exemplary embodiments, the three-dimensional structuring may involve indentations, protrusions and surfaces with large corrugations such as trenches, pores or even fibrous structures, or fabric, etc. This three-dimensional structuring leads on the one hand to an effect of adhesion acting significantly more strongly, assuming the material on which it is based is matched to the liquid in this regard, so that a thin liquid film is taken up when emerging from the liquid in the first section. On the other hand, superficial microvessels may even be formed, which can take up small liquid portions in a similar way as in the case of a paddlewheel. It is quite possible that the liquid portions will become separated during the rotation by the force of gravity—possibly even overcoming the adhesion—and drain away over the surface. If the duration of this draining process is comparable to the period of a rotation, the desired effect of obtaining a thin layer thickness of the liquid on the surface of the rotatable arrangement still occurs.

According to the invention, the apparatus furthermore comprises at least one radiation source which is adapted to emit radiation in the ultraviolet wavelength range, in particular UV-C radiation, into the second section and onto the surface while the latter is located in the second section according to the rotational position of the arrangement. In this way, substantially complete sterilization of the liquid film exposed to the at least one UV light source in the second section, or of the liquid portions, may be achieved.

As a result, the three-dimensional surface structure of the rotatable arrangement therefore leads to small liquid portions or a thin liquid layer being transported during the rotation from one liquid region, the first section, upward into an irradiation region, the second section. Advantageously, the UV radiation then only needs to penetrate relatively small liquid layer thicknesses. In conjunction with this, one particular advantage is that the UV radiation is directed onto regions with an increased germ density because the germs tend to accumulate on the surface. The surface structure may furthermore prevent microorganisms being flushed from the surface of the rotatable arrangement by shear forces at the transition from water to air. By the three-dimensional structuring, this effect is improved even more significantly in comparison with a smooth surface.

Furthermore, a particular advantage may be achieved since little installation space is required because of the closed construction. In conjunction with this, liquid damage and contamination outside the apparatus may be avoided. Use of the device for example in dishwashers or washing machines, etc., or generally for wastewater or service water disinfection in private households, in business premises or in catering is therefore particularly advantageous. According to one particular exemplary embodiment, energy-efficient and space-saving UV LEDs, which are entirely sufficient for radiating through the thin layer thicknesses achieved here, are used as radiation sources. At the same time, a high through-flow is obtained despite the compact construction.

For the UV-C radiation emitted by the radiation sources, the wavelength ranges mentioned in the introduction to the description may advantageously be established, preferably in the range of from 249 nm to 338 nm (effective against bacteria on biofilms), particularly preferably from 292 nm to 306 nm (with the efficacy maximum at 296 nm), or from about 260 nm to 270 nm (DNA absorbs radiation maximally).

According to one refinement of the proposed apparatus for sterilizing liquids, the rotatable arrangement has a rotation shaft mounted on a wall of the container, and at least one disk or roller which is fitted on the rotation shaft and can rotate therewith, the surface with the three-dimensional structuring being a surface of the disk or roller. Because of the simple geometrical structure, such a construction of the rotatable arrangement allows optimal irradiation of the surface during the rotation process and at the same time offers a large surface area in relation to the spatial volume. Furthermore, simple options for the rotational drive are thereby made possible.

According to one refinement of the proposed apparatus for sterilizing liquids, the three-dimensional structuring of the surface is formed by depressions and/or elevations in the surface. In the depressions, it is in this case possible to take up liquid portions whose layer thickness is still sufficiently thin to be irradiated through, but which allows the entrainment of an amount of liquid which is much greater than the simple wetting of a smooth surface.

According to a further refinement of the proposed apparatus for sterilizing liquids, the three-dimensional structuring of the surface is formed by a mesh or a fabric or by a porous material construction. In this way, a particularly effective surface area increase is achieved.

One apparatus respectively relating to the two aforementioned aspects is refined in that the surface is formed by comparatively UV-resistant polymer materials. This offers the advantage that the germs preferentially accumulate on the surface formed from polymer materials. The selective action of the germ extraction from the first section is thereby enhanced even further compared with simple proportional liquid removal.

One apparatus likewise respectively relating to the two aforementioned aspects is refined in that the surface is formed by inorganic materials, in particular silicon dioxide, aluminum oxide or zeolites. These are found to be highly UV-resistant, so that the durability of the apparatus is ensured or lengthened. With the material group of zeolites, because of the internal structure, there is the added capacity of being able to take up considerable amounts of water, which may be released again by heating. Furthermore, residues adhering in the case of these materials may be dried and burnt away, which may give them a certain advantage over polymer materials.

One apparatus again respectively relating to the aforementioned aspects is refined in that the surface is provided with a photocatalytic coating, in particular titanium dioxide. Titanium dioxide is in this case present in a modification which is referred to as anatase. Anatase allows a photoassisted catalytic reaction which is composed of a series of physical and chemical processes. Initially, for example, the UV-C radiation is absorbed so that electrons are excited and brought into states with higher energy. In the case of anatase, the electrons change from the valence band into the conduction band so that an electron-hole pair is created. The electron diffused onto the surface then leads chemically to a reduction and the hole correspondingly likewise diffused onto the surface leads to oxidation in relation to the medium lying on the surface, i.e. the liquid. For example, a highly reactive hydroxyl radical may in this case be formed, which in turn can aggressively oxidize organic substances in the liquid. This feature combination therefore additionally reinforces the effect to be achieved.

According to a further refinement of the proposed apparatus for sterilizing liquids, the first section is separated from the second section by a separating wall in which slits or recesses for the at least one disk or for the roller are provided. With this separating wall, on the one hand water splashes due to vibrations may be prevented, and on the other hand if the separating wall comprises a reflective surface, the irradiation of the surface of the rotatable arrangement may be improved. By the reflection, above all lateral regions of the disk surfaces may also be irradiated.

According to a further particular refinement of the proposed apparatus for sterilizing liquids, the at least one radiation source is an LED emitting radiation in the ultraviolet wavelength range, in particular UV-C radiation. As described, the proposed device may also be used in principle with often more economical quartz low-pressure or medium-pressure lamps, which achieve a high radiant intensity. UV LEDs, however, allow a particularly small installation space and are also suitable for irradiation of the thin liquid layer, or the liquid portions. Because of the small overall size, the LEDs may also be distributed better in the arrangement, in order inter alia to irradiate lateral corner regions or intermediate spaces homogeneously, for example if, according to exemplary embodiments described below, a rotatable arrangement having a plurality of disks arranged next to one another is used.

According to a further particular refinement of the aforementioned aspect, a first number of LEDs are provided, the outer wall of the interior comprising a transparent upper wall lying opposite the first section in the region of the second section, the first number of LEDs being arranged at least in the region of the transparent upper wall and radiating through the latter or therefrom onto the surface. This arrangement is particularly advantageous when the rotatable arrangement is formed in the manner of a roller and has a large circumferential surface, which therefore rotates through below the UV LEDs during a rotation. The upper wall may be flat and plane, or alternatively dome-shaped or roof-shaped. Preferably, the shape is matched to that of the roller in order to reduce the distance between the LEDs and the roller.

According to one particular refinement of the aforementioned aspect, a second number of LEDs are provided, the outer wall of the interior comprising mutually opposite transparent side walls in the region of the second section, the second number of LEDs being arranged at least in the region of one of the transparent side walls and radiating through the latter or therefrom onto the surface. In this way, irradiation of those surface parts which are positioned at the top and the bottom on the rotatable arrangement is also possible, so that an increased efficiency is achieved overall.

According to a further refinement of the proposed apparatus for sterilizing liquids, the apparatus comprises a motor which is connected to the rotation shaft and drives the latter when it is supplied with power. In this way, the throughput in relation to the sterilization may be adjusted accurately.

According to an alternative (or even only additional) refinement thereto of the proposed apparatus for sterilizing liquids, it comprises a passive drive unit for the rotatable arrangement. The passive drive unit is adapted to receive a linear impulse of the liquid admitted through the inlet and liquid flowing out through the outlet and to convert it into a rotational impulse for the rotatable arrangement. In this case, the flow pressure of the liquid flowing through the reactor is utilized. Here, the motor could even be entirely omitted so that a further space saving is achieved and additional and possibly required maintenance of the motor is avoided.

According to a further refinement of the proposed apparatus for sterilizing liquids, it comprises a cleaning and/or drying unit, in particular IR LEDs or IR lasers, which is adapted to dry, burn away and/or remove residues locally adhering in the second section and/or on the rotatable arrangement. For example, IR sources may irradiate a strip-shaped region on the rotating rollers or disks, in particular for regular cleaning purposes. To this end, the liquid supply may be stopped, the reactor may be allowed to run empty, and in the state empty of liquid irradiated with IR light. In this way, the advantage of self-cleaning is achieved, which further reduces outlay on maintenance.

According to a further refinement of the proposed apparatus for sterilizing liquids, it comprises a return line, one end of which is connected to the outlet and the other end of which is connected to the inlet. A 3-way valve is provided at the point of connection of the return line to the inlet or to the outlet, or respectively at both connecting points. A control apparatus connected to the 3-way valve(s) is also adapted to control the 3-way valve or the 3-way valves in order to carry out batch operation. A pump which drives the return of the liquid to the inlet may be provided in the return line. In this way, it is possible to carry out a plurality of sterilization cycles with the same reactor, and therefore to further improve the degree (or factor) or the quality of the sterilization.

According to an alternative refinement thereto of the proposed apparatus for sterilizing liquids, it comprises at least one further container substantially of the same design, in addition to the first container, the inlet of which is connected to the outlet of the first container. The reactor may therefore comprise two or even more successive sterilization stages in a cascade fashion. According to this alternative, a plurality of sterilization cycles may also be carried out with the same reactor and the degree (or factor) or the quality of the sterilization may therefore be improved further. Valves and optionally also pumps, by which the running is controlled, may be provided between the sequenced containers.

In general, a control apparatus which controls the running of the sterilization may be provided not only in the two refinements mentioned last. This may be connected to a valve and/or a pump at the inlet, in order to admit the liquid to be sterilized. It may be connected to a motor—if there is one—in order to use the latter to drive the rotation of the rotatable arrangement so that its surface takes up a liquid film or small liquid portions in the first section and carries them into the second section during the rotational movement. It may furthermore be connected to the radiation source or sources in order to turn the latter on when the rotatable arrangement is rotating, so that they emit UV or UV-C radiation onto the surface of the rotational arrangement and the liquid film wetting the latter, or the entrained liquid portions. It may also be connected to a valve and/or a pump at the outlet, in order to discharge the at least partially sterilized liquid. In the case of the return line, it may be connected to the three-way valve and/or the corresponding pump in the return line, in order to cause feedback of the liquid for a next cycle. Alternatively, it may be connected to the corresponding devices (valves, pumps, radiation sources) of a next container in a cascade of containers, in order to control them in the same way.

Advantageously, to this end a sensor, with which the transmission of the liquid or other quantities representing the degree of sterilization can be measured, may be provided in the outlet or in a line connected to the latter downstream in the flow direction.

According to a further refinement, a control apparatus, which is connected to the motor and to at least one valve at the inlet or outlet (preferably in each case one valve), may be provided. This control apparatus may be adapted to carry out batchwise operation, the roller or the disks of the rotatable arrangement executing a number of rotations, with a closed valve, which is predefined or dependent on the result of the measurement with the aid of a sensor (for example bioburden by means of a fluorescence measurement or turbidity with the aid of a transmission measurement). The at least one valve or the valves is/are subsequently opened in order to sterilize a subsequent batch of liquid (a subsequent washing liquor).

Further or alternative refinements of the apparatus according to the aspects mentioned above provide for adjusting the rotational speed of the rotatable arrangement according to the sterilization outcome to be achieved.

Further advantages, features and details of the invention may be found from the claims, the following description of preferred embodiments and with the aid of the drawings. In the figures, references which are the same denote features and functions which are the same.

BRIEF DESCRIPTION OF THE DRAWING(S)

In the following description of preferred exemplary embodiments, it should be taken into account that the present disclosure of the various aspect is not restricted to the details of the construction and the arrangement of the components as they are presented in the following description and in the figures. The exemplary embodiments may be implemented or carried out in a variety of ways in practice. It should furthermore be taken into account that the expressions and terminology employed here are used merely for the purpose of specific description and they should not be interpreted restrictively by the person skilled in the art per se.

Figure 1:
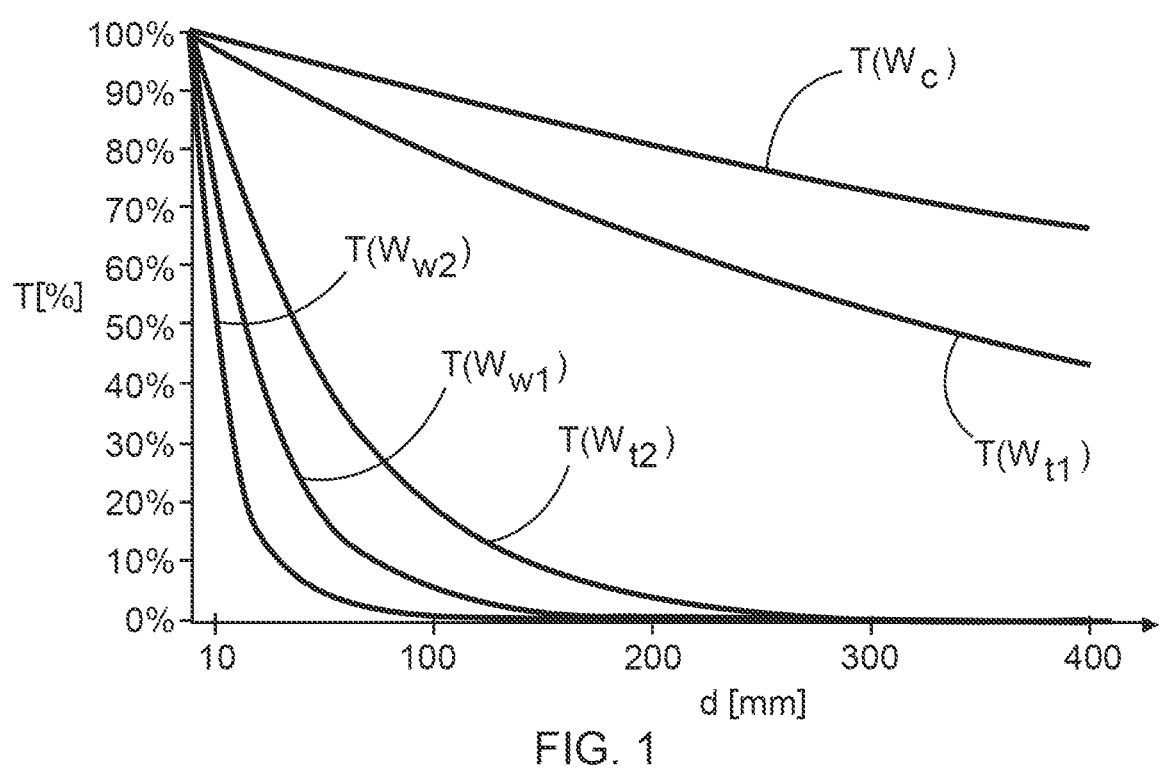
FIG. 1 shows a diagram of the spectral UV-C transmission T [in %] at a wavelength of 254 nm in water as a function of the layer thickness d [in mm], and specifically for ultrapure water (SSK254 at d=10 mm: 99%), drinking water (SSK254 at d=10 mm: 98%), drinking water (SSK254 at d=10 mm: 85%), wastewater (SSK254 at d=10 mm: 75%), and wastewater (SSK254 at d=10 mm: 50%)

First, FIG. 1 illustrates in a diagram the influence of a reduction in the transmission as a function of the layer thickness due to turbidity or pollution with various water qualities. The spectral UV-C transmission T [in %] is shown at a wavelength of 254 nm conventionally used for this purpose in water as a function of the layer thickness d [in mm], and specifically for ultrapure water (curve $T(W_c)$: SSK254 at d=10 mm: 99%), drinking water (curve $T(W_{t1})$: SSK254 at d=10 mm: 98%), drinking water (curve $T(W_{t2})$: SSK254 at d=10 mm: 85%), wastewater (curve $T(W_{w1})$: SSK254 at d=10 mm: 75%), and wastewater (curve $T(W_{w2})$: SSK254 at d=10 mm: 50%).

As may be seen, ultrapure water absorbs the incident UV-C light relatively weakly. However, the wavelength-dependent radiation absorption is greatly influenced because of compounds dissolved in the water as well as by undissolved substances, as may be seen clearly in FIG. 1 from the curves for drinking water and wastewater. The extent of the UV-C absorption is consequently correlated with the water quality. The attenuation of the radiation as a function of the layer thickness is determined by an optical measurement and may be expressed as a spectral attenuation coefficient SSK. For example, 10 mm may be taken as a reference layer thickness. The measurement values of the attenuation coefficients are often used in the scope of sterilization and water treatment. In particular, the special coefficient SSK254 is determined without prior filtration at the wavelength 254 nm, so that substances causing turbidity as well as particles may be jointly registered with this coefficient. The measurement value is therefore increased in comparison with other coefficients (for example SAK), but precisely this coefficient is practically relevant in reactors because it is the extent of the actual radiation through the liquid for a given layer thickness which is important.

For an exemplary application of the embodiments described below in dishwashers or washing machines, in FIG. 1 the two curves $T(_{w1})$ and $T(_{w2})$ are relevant, especially the curve for more strongly polluted wastewater $T(_{w2})$. They show that even with the layer thicknesses of 5 mm, only 10% of the initial intensity of the UV-C radiation remains. The embodiments described below attempt to take this into consideration.

Figure 2:
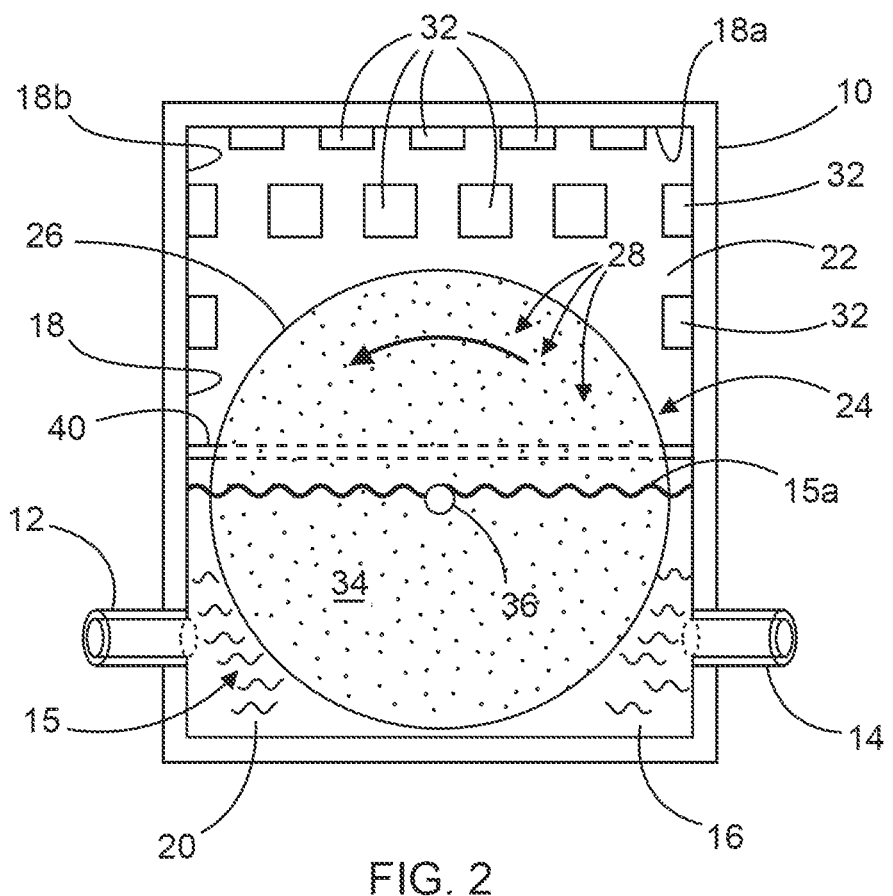
FIG. 2 shows a UV-C reactor according to a first embodiment in a schematic cross-sectional view from the side.
Figures 3, 4:
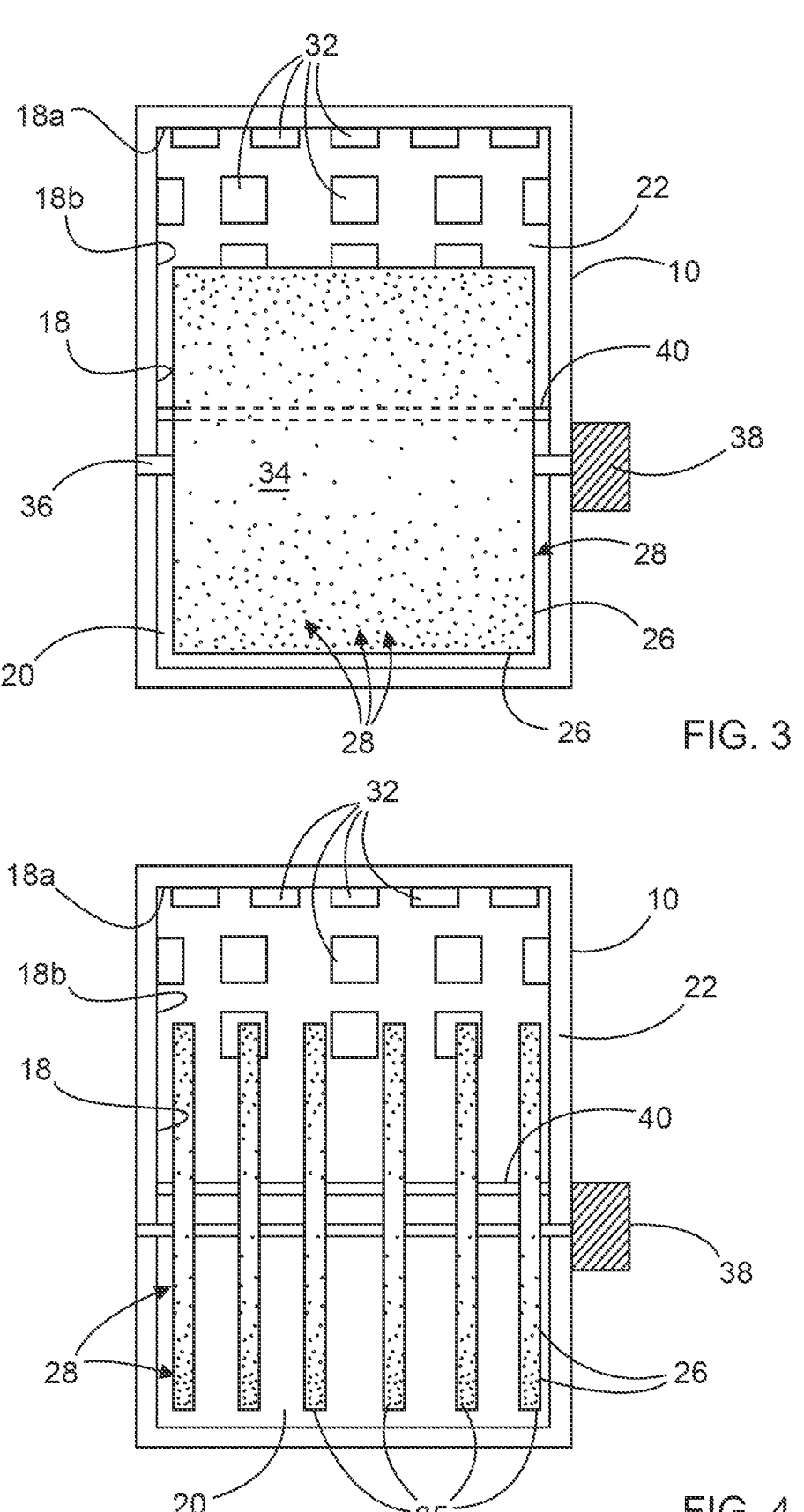
FIG. 3 shows the UV-C reactor of FIG. 2 in a schematic cross-sectional view from the front.
FIG. 4 shows a UV-C reactor according to a second embodiment in a schematic cross-sectional view from the front.

FIG. 2 shows a first embodiment of an apparatus for sterilizing a liquid in a side view, while FIG. 3 shows the same embodiment in a perspective from the front. In particular, the embodiment as well as all embodiments described below constitute a UV-C reactor such as may be used for instance in dishwashers, washing machines or other appliances which operate with liquids in order to perform tasks.

The apparatus shown comprises a container 10 having an inlet 12, an outlet 14 and an interior 16, the inlet 12 and the outlet 14 establishing a connection of the interior 16 to the outside of the container 10 and being adapted to supply a liquid 15 to the interior 16 and to release it from the interior 16. The liquid 15 may, particularly in a dishwasher, be water with the quality of wastewater.

The interior 16 is divided into a lower first section 20 and an upper second section 22. There is the liquid 15 in the lower first section 20 when it is introduced through the inlet 12. The inlet 12 and the outlet 14 both open into the lower first section 20 of the interior 16. During operation, the delivery of liquid through the inlet 12 and the discharge from the outlet 14 are regulated in such a way that a liquid level 15a in a vertical direction does not depart from the lower first section 20. The liquid 15 thus remains substantially entirely in the first section.

The lower first section 20 and the upper second section 22 may be separated from one another by a separating wall 40. The upper second section 22 is arranged above the lower first section 20. The separating wall 40 may extend in a horizontal direction. The separating wall 40 comprises an opening or a number of slits according to embodiments to be described below, through which a rotatable arrangement 24 extends. A multiplicity of radiation sources 32, which are formed as UV-C LEDs in the embodiments described here, are positioned in the region of the outer wall 18. The radiation sources 32 may in this case be positioned both on an upper wall 18a and on a side wall 18b of the outer wall 18. As is schematically represented in FIGS. 2 and 3, the UV-C LEDs may be positioned at equal distances from one another on the respective walls 18a, 18b, in order to achieve homogeneous and maximally intensive illumination of the second section 22 with UV-C radiation both from above and from the side. The wavelength of the emitted radiation may for example be 265 nm and the power may be from 50 to 100 mW. In this case, the separating wall 40 separating from the first section on the one hand may reflect the radiation back into the second section, if it is formed from a suitable reflective material or a corresponding coating, and on the other hand it prevents water splashes from the lower first section 20.

The rotatable arrangement 24 in this first embodiment comprises a roller 34 which has a cylindrical shape. The roller 34 is fitted rotatably on a rotation shaft 36. In this embodiment, the rotation shaft 36 extends in a horizontal direction through an upper region of the lower first section 20, i.e. substantially parallel to a liquid level 15a when liquid 15 is admitted into the lower first section 20. It is alternatively also possible for the rotation shaft 36 to extend through a lower region of the upper second section 22. The rotation shaft 36 is mounted on mutually opposite side walls 18*b*. The roller 34 may rotate together with the rotation shaft 36 relative to corresponding rotational bearings on the side walls 18*b*, or the roller 34 may rotate relative to the fixed rotation shaft 36. The alignment of the rotation shaft 36 need not necessarily be horizontal, but may also be inclined.

Figure 11:
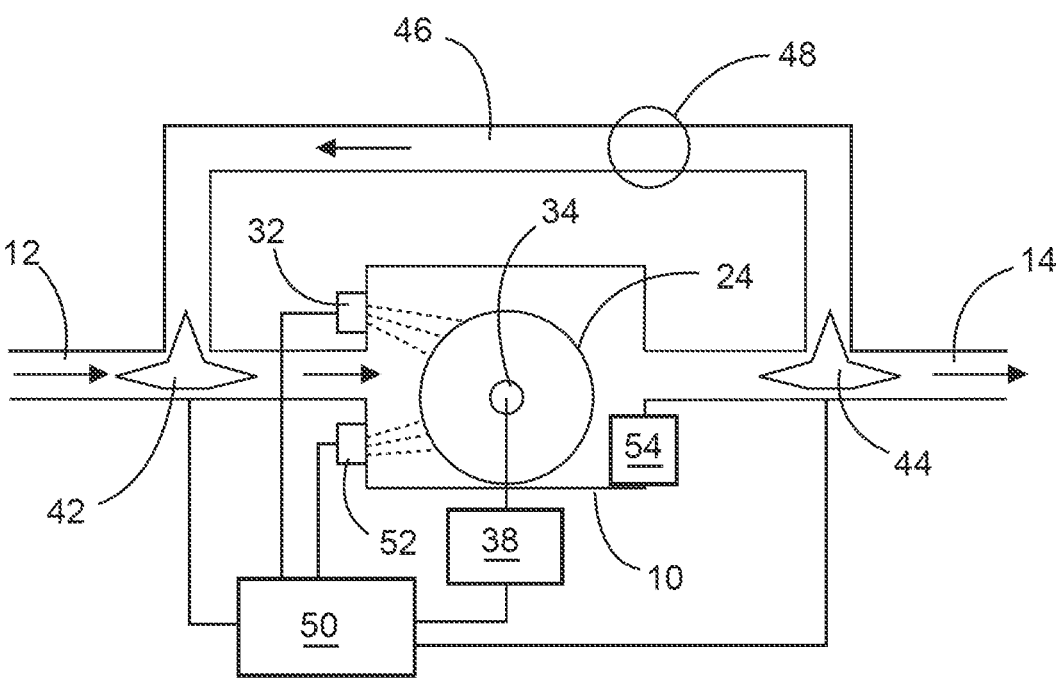
FIG. 11 shows a schematic outline of a UV-C reactor with a return line for batch operation according to a further embodiment.

The rotation of the roller 34, or of the rotation shaft 36, may be carried out using a motor 38 which is supplied with power by a current or voltage source (not shown) and is controlled by a control apparatus (likewise not shown) (but see FIG. 11, Ref. 38). The rotational speed may, for example, be adapted according to a required throughput quantity, a degree of pollution of the liquid 15 or a radiant flux of the radiation sources 32.

A surface 26 of the roller 34 is formed by the lateral cylinder surface and the two end faces of the cylindrical shape. The surface 26 of the roller 34 comprises three-dimensional structuring 28, which is schematically indicated in the figures by dots. The three-dimensional structuring 28 leads to an increase in the surface area. The three-dimensional structuring 28 provides in particular indentations, depressions, protrusions and surfaces with large corrugations, for instance trenches, pores or fibrous structures or the like. The surface area increase allows, by adhesion, the entrainment of a somewhat thicker liquid film 30 than would be the case with a smooth surface. The depressions furthermore make it possible to entrain individual liquid portions 31 which are taken up therein.

As may be seen in FIGS. 2 and 3, because of the positioning of the rotation shaft 36 close to the liquid level 15*a*, the majority of the surface 26 moves through the liquid 15 in the lower first section 20 during a rotation in order then correspondingly to execute a movement through the upper second section 22 irradiated with UV-C radiation by the radiation sources 32, which is filled with air, before it is immersed again into the liquid 15 in the lower first section 20 and in this case repeats the contact with the liquid 15. Continuous transport of a liquid film 30 freshly taken up, or of liquid portions 31, therefore takes place through a spatial region in which the surface 26, or the three-dimensional structuring 28, is irradiated directly by the UV-C light sources 32. The liquid film 30, or the liquid portions 31, have a sufficiently thin layer thickness so that, despite a possibly increased degree of pollution, sufficient UV-C irradiation takes place through them, which is enough to achieve the satisfactory sterilization.

The rotational speed may be adapted according to the sterilization outcome to be achieved. The disinfected liquid film 30, or the liquid portions 31, are fed back to the liquid 15. At the same time, germs adhering to the surface 26 of the roller 34, or even organisms in biofilms, are reliably inactivated by the UV-C radiation. Since the germs tend to adhere to such surfaces 26, selective action furthermore takes place.

According to a modified exemplary embodiment, batch-wise operation is also possible in such a way that the roller 34 executes (or as shown in FIG. 4 which is described below: the disks 35 execute) a plurality of rotations with closed entry and exit valves before the corresponding valves are opened again for the sterilization of a next batch.

A second exemplary embodiment is shown in FIG. 4. As in FIG. 3, this is a view of a UV-C reactor from the front, i.e. the inlet 12 and the outlet 14 (insofar as they lie opposite) face out of the plane of the drawing. The corresponding side view is similar to that in FIG. 2. The same references are used for comparable features and details, so that repetition thereof is omitted here for the sake of brevity of the description.

As in the first exemplary embodiment, the container 10 comprises a lower first section 20 and an upper second section 22. The distribution of the radiation sources 32 on the side wall 18*b* and the upper wall 18*a* in the upper second section 22 is identical to the first exemplary embodiment. In contrast to the first exemplary embodiment, a multiplicity of disks 35, which are fitted parallel to one another and at equal distances on the rotation shaft 36, are provided instead of the roller 34. The diameter of the disks 35 is the same as the diameter of the roller 34, so that the narrow circumferential edge faces of the surfaces 26 of the disks 35 pass during a rotation through the lower first section 20 almost as far as a bottom wall, and then travel through slits in the separating wall 40 and proceed through a large part of the upper second section 22. As in the first exemplary embodiment, the surfaces 26 are provided with three-dimensional structuring 28 and consequently entrain a liquid film 30 and/or liquid portions 31. The effect of the sterilization by exposure of the surface 26 to the UV-C radiation of the LEDs (light sources 32) is the same as in the first exemplary embodiment. Other than in the first exemplary embodiment, however, there is a much larger surface area 26 since each disk 2 possesses end or side faces which can entrain the liquid film 30 or the liquid portions 31. Here, it is advantageous for the radiation sources 32 to be positioned in such a way that they can also radiate into the narrow intermediate spaces between the disks 35 and no shadowing takes place. Furthermore, back-reflection at the reflective faces of the separating wall 40 may take place on the left and right of the slits for the disks.

Figure 5:
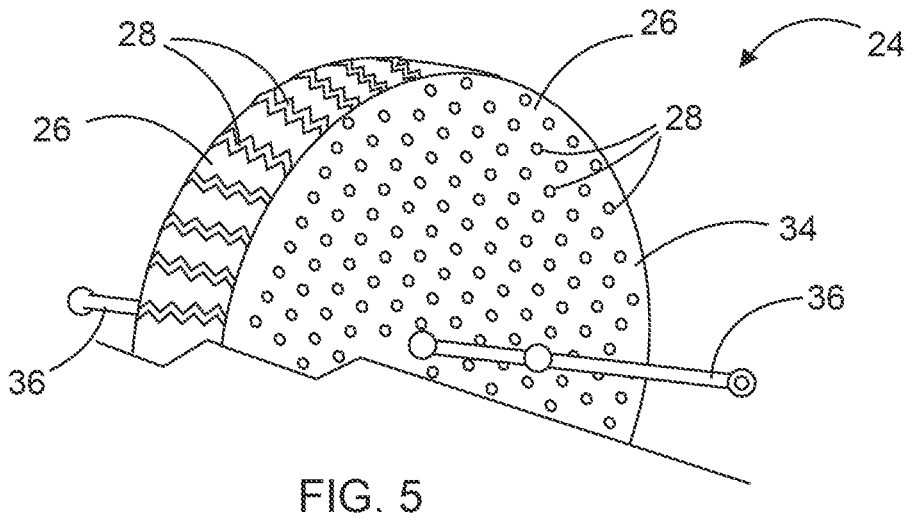
FIG. 5 shows a detail of a roller in a perspective view with three-dimensional structuring of the surface according to one exemplary embodiment.
Figure 6:
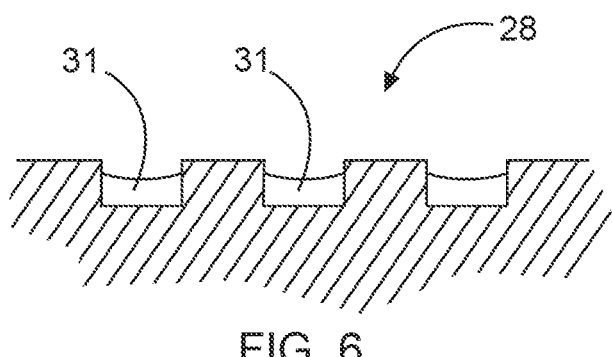
FIG. 6 shows a cross section through a surface with three-dimensional structuring of the surface according to one exemplary embodiment.

FIG. 5 purely schematically shows a roller 34 on a rotation shaft 36 with two different types of three-dimensional structuring 28. On the outer circumferential face (cylinder side surface) of the roller 34, a zigzag-shaped trench pattern similar to a tire tread is formed as three-dimensional structuring 28. FIG. 6 purely schematically shows a cross section through the trench pattern, small liquid portions 31 being taken up in the trenches when the relevant surface section of the surface 26 is immersed in the liquid 15 during the rotation and entraining them during the emersion.

In the end or side face of the roller 34 shown in FIG. 5, on the other hand, individual holes or pores are formed as three-dimensional structuring 28. Since the end faces constantly extend in the vertical direction during the rotation, the force of gravity plays a greater part in the draining of the liquid compared with the adhesion, so that a different pattern may be advantageous for the three-dimensional structuring 28. The pore pattern selected here on the end face rather than the trench pattern on the circumferential face is purely exemplary, and the person skilled in the art will make a suitable selection of patterns according to the underlying material, the state of the liquid and the radiation power or wavelength, in order to obtain a desired thickness, which ensures an optimal throughput, for the liquid film 30 or the liquid portions 31 on the surface 26.

Figure 7:
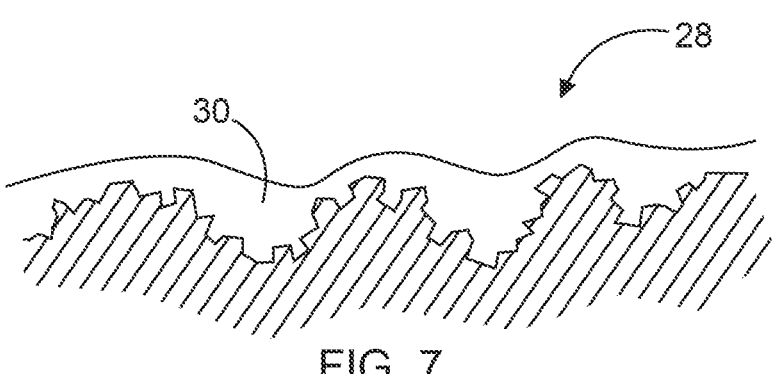
FIG. 7 shows a cross section through a surface with three-dimensional structuring of the surface according to one exemplary embodiment.
Figure 8:
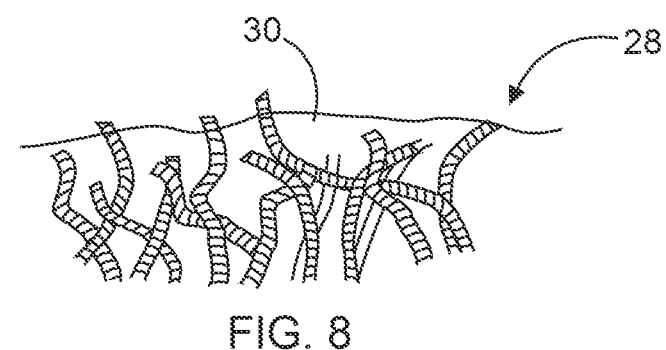
FIG. 8 shows a cross section through a surface with three-dimensional structuring of the surface according to one exemplary embodiment.

FIGS. 7 and 8 show further examples of three-dimensional structurings 28 on the surface 26. FIG. 7 shows structuring 28 with coarse grains sintered together comprising trenches and pores, which lead to a particularly large surface corrugation or surface area increase. FIG. 8 very schematically shows three-dimensional structuring, which likewise provides a particularly large surface area increase, formed by a wire mesh.

It may be emphasized here that in terms of basic structure, taking the corresponding dimensioning into account, it is possible to use disks which are similarly known from the technical field of material processing, in particular grinding disks with coarse granulation, detent-edge disks, lamellar grinding disks or wire mesh disks, etc.

Figure 9:
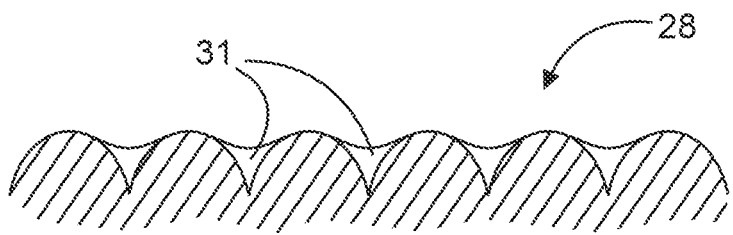
FIG. 9 shows a cross section through a surface of a roller with three-dimensional structuring of the surface according to one exemplary embodiment.
Figure 10:
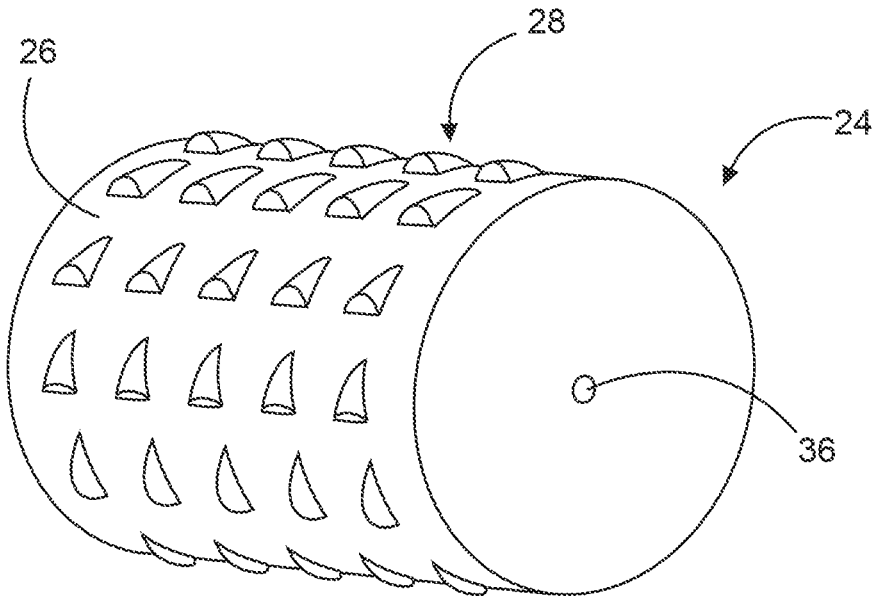
FIG. 10 shows a perspective view of a surface with three-dimensional structuring of the surface according to one exemplary embodiment.

The same applies for rollers. FIG. 9 purely by way of example shows a groove profile, and FIG. 10 illustrates the possibility of small shovel-like or half funnel-shaped protrusions formed in the surface 26 on the surface and/or small shovel-like or half funnel-shaped recesses in the surface, respectively as three-dimensional structuring 28, the structures being inclined in both embodiments relative to a normal to the surface in such a way that take-up (like a kind of "scooping out") and entrainment of liquid is ensured.

As described, the disks 35 or rollers 34 are preferably formed, at least on their surfaces 26, from materials to which germs such as bacteria, viruses, fungal spores, etc., can adhere particularly well. Because of the complexity of the adhesion mechanisms and the wide range of microorganisms, a wide range of possible materials are to be considered. Various material classes may be envisioned, which may optimally be used depending on the application (dishwasher, washing machine, etc.) and the type of contamination prevalent there. In principle, polymer materials or plastics, which are particularly suitable in principle for the adhesion of microorganisms, may be used. With a view to the UV-C application, however, more UV-resistant materials are preferable. Furthermore, inorganic materials such as silicon dioxide, aluminum oxide or zeolites may be used. In addition, coatings with photocatalysts, in particular titanium dioxide, may be employed.

FIG. 11 shows a further exemplary embodiment. The container 10 with the features it contains, including the inlet 12 and the outlet 14, may correspond substantially to the exemplary embodiments of FIGS. 2 to 4. One particular feature here is a return line 46, which leads back from the outlet 14 to the inlet 12. This return line 46 allows batchwise operation. At the points of connection respectively at the inlet 12 and the outlet 14, the return line 46 branches off and is in this case controlled by 3-way valves 42, 44. In the return line 46, there may be a pump 48 which drives the return flow. Alternatively, the pump 48 may also be positioned in the outlet before the 3-way valve 44, in which case the same pump may be used for the return flow as well as for the through-flow operation (i.e. for pumping from the reactor). The 3-way valves 42, 44 may be controlled by a control device 50 which also controls the motor 38 for the rotation of the rotatable arrangement 24. The control device 50 may also be connected to the pump 48 as well as to a sensor 54 (connection not explicitly shown in FIG. 11), in order to maintain the return flow depending on a measurement result by the sensor (for example transmission measurement or particularly also fluorescence measurement) until a desired measurement result is obtained, after which the 3-way valves 42, 44 are switched to through-flow. The position of the sensor 54 in the interior is illustrated purely schematically in FIG. 11, and depends in practice inter alia on the measurement to be carried out, and may be adapted suitably by the person skilled in the art who is carrying out the exemplary embodiment. For example, a sensor 54 for the fluorescence measurement would rather be placed in the upper section 22 since there are already suitable UV-C radiation sources here. A measurement of the transmission in order to determine turbidity would, however, rather take place in the lower section in order to have access to the liquid.

Using fluorescence excitation (for example by the UV-C radiation source) and sensors 54 sensitive in the UV-A, UV-B and/or visible range, the amount and possibly the type of contamination present may be deduced. Furthermore, the control device 50 also controls the radiation sources 32 as well as a cleaning and/or drying unit, which may involve IR LEDs or IR lasers that can expediently dry, burn away and remove adhering residues.

According to one modification, it is also possible to carry out such a fluorescence measurement in the interior of the reactor and to employ the UV-C LEDs used for the disinfection themselves as an excitation light source. The one or more sensors 54 for detecting the fluorescence signal would then likewise be located in the interior of the reactor—preferably at different positions so as to be able to collect all the radiation. The sensors could, for example, be placed centrally on the upper side and centrally on the side faces, respectively instead of a UV-C LED. In order to avoid erroneous measurement, the sensors may be filtered in respect of the excitation light source so that the exciting UV-C radiation is thus not transmitted but is preferably reflected.

Figure 12:
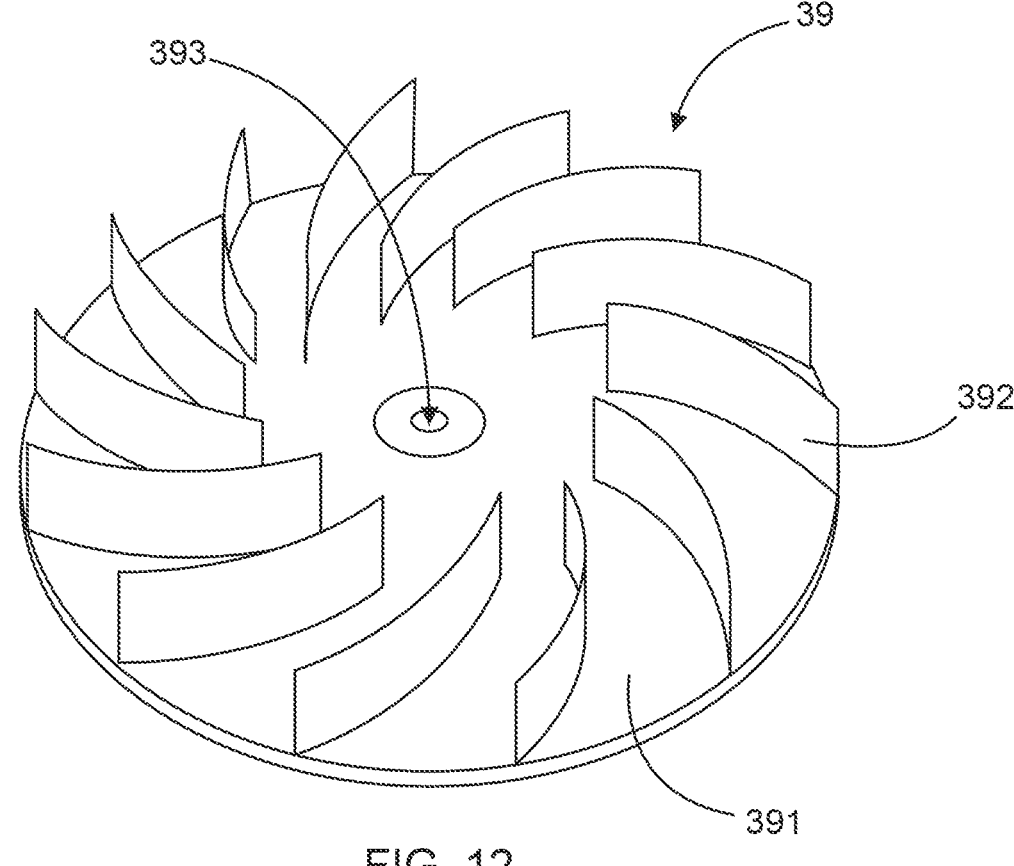
FIG. 12 shows a perspective view of a passive drive unit for use in a UV-C reactor in FIG. 2, 3 or 4 according to a modified exemplary embodiment.

Further modifications or variations are possible so long as the scope defined in the appended claims is not departed from. In the exemplary embodiments above, for example, a motor was used as a drive source for the rotation of the rotatable arrangement (roller 34 or disks 35). It is, however, likewise possible for a passive drive source to be selected, if for example the roller 34 shown in FIG. 2 rotates of its own accord because of the liquid flow between the inlet 12 and the outlet 14, which acts tangentially on it, and therefore exposes a liquid film 30 or the liquid portions 31 to the irradiation by the UV-C LEDs. This effect may be utilized even better if, as shown in FIG. 12, an additional passive drive source 39 is fitted by means of a bore 393 on the rotation shaft 36, which is formed as a disk 391 and comprises blades 392 that receive force from the liquid flow in a similar way to a turbine or a mill wheel in order to convert a linear impulse into a rotational impulse for the rotatable arrangement 24.

Furthermore, a power supply for the drive devices (motor, pumps, etc.) or radiation sources, control apparatus and valves is not shown in the embodiments and exemplary embodiments above. It is, however, to be understood that corresponding measures may be implemented according to the embodiments.

LIST OF REFERENCES 10 container
12 inlet
14 outlet
15 liquid, contaminated water or wastewater
15a liquid level
16 interior
18 outer wall
20 lower first section
22 upper second section
24 rotatable arrangement
26 surface
28 three-dimensional structuring
30 liquid film
31 liquid portions
32 light sources, UV-C LEDs
34 roller
35 disk
36 rotation shaft
38 motor
39 passive drive unit

391 disk
392 blades
393 bore
40 separating wall
42 3-way valve
44 3-way valve
46 return line
48 pump
50 control apparatus
52 cleaning and/or drying unit, IR LEDs/IR lasers
54 Sensor for fluorescence measurement (or transmission)

The invention claimed is:

1. An apparatus for sterilizing a liquid, comprising:
a container having an inlet, an outlet and an interior with an outer wall which defines a first section and a second section, the first section being configured to receive the liquid when it is admitted through the inlet, and the second section forming a subregion of the interior above the first section;
wherein the first section is separated from the second section by a separating wall in which slits or recesses for at least one disk or roller are provided, and wherein the separating wall comprises a reflective surface;
a rotatable arrangement set up in the interior with a surface, the rotatable arrangement being configured in such a way that during a rotation the surface moves from the first section into the second section and from there back into the first section;
wherein the surface comprises three-dimensional structuring which is formed in such a way that it can entrain a liquid film and/or small liquid portions with it when it is immersed into and emerges from the liquid admitted into the first section;
at least one radiation source which is adapted to emit radiation in an ultraviolet wavelength range into the second section and onto the surface while the surface is located in the second section according to a rotational position of the arrangement.

2. The apparatus as claimed in claim 1, wherein the rotatable arrangement has a rotation shaft mounted on a wall of the container, and at least one disk or roller which is fitted on the rotation shaft and can rotate therewith, the surface with the three-dimensional structuring being a surface of the disk or roller.

3. The apparatus as claimed in claim 1, wherein the three-dimensional structuring of the surface is formed by depressions or elevations in the surface.

4. The apparatus as claimed in claim 1, wherein the three-dimensional structuring of the surface is formed by a mesh or a fabric or by a porous material construction.

5. The apparatus as claimed in claim 1, wherein the surface is formed by comparatively UV-resistant polymer materials.

6. The apparatus as claimed in claim 1, wherein the surface is formed by inorganic materials.

7. The apparatus as claimed in claim 1, wherein the surface is provided with a photocatalytic coating.

8. The apparatus as claimed in claim 1, wherein the at least one radiation source is an LED emitting radiation in the ultraviolet wavelength range.

9. The apparatus as claimed in claim 8, wherein a first number of LEDs are provided, the outer wall of the interior comprising a transparent upper wall lying opposite the first section in a region of the second section, the first number of LEDs being arranged at least in the region of the transparent upper wall and radiating through the region of the transparent upper wall or therefrom onto the surface.

10. The apparatus as claimed in claim 9, wherein a second number of LEDs are provided, the outer wall of the interior comprising mutually opposite transparent side walls in the region of the second section, the second number of LEDs being arranged at least in the region of one of the transparent side walls and radiating through the region of one of the transparent side walls or therefrom onto the surface.

11. The apparatus as claimed in claim 1, further comprising a motor, which is connected to a rotation shaft and drives the rotation shaft when it is supplied with power.

12. The apparatus as claimed in claim 11, furthermore comprising a control apparatus, which is connected to the motor and to at least one valve at the inlet or outlet, the control apparatus being adapted to carry out batchwise operation, a roller or disks executing a number of rotations, with a closed valve, which is predefined or determined by measuring a turbidity or a bioburden with aid of a sensor, after which the at least one valve is opened in order to sterilize a subsequent batch of liquid.

13. The apparatus as claimed in claim 1, further comprising a passive drive unit for the rotatable arrangement, the passive drive unit being adapted to receive a linear impulse of the liquid admitted through the inlet and flowing out through the outlet and to convert it into a rotational impulse for the rotatable arrangement.

14. The apparatus as claimed in claim 1, furthermore comprising a cleaning and/or drying unit, which is adapted to dry, burn away and remove residues locally adhering in the first or second section and/or on the rotatable arrangement.

15. The apparatus as claimed in claim 1, furthermore comprising a return line including at least two ends, one end of which is connected to the outlet and an other end of which is connected to the inlet, wherein a 3-way valve is provided at a point of connection of the return line to the inlet or to the outlet, or respectively at both connecting points, wherein a control apparatus connected to the 3-way valve is adapted to control the 3-way valve or the 3-way valves in order to carry out batch operation.

16. The apparatus as claimed in claim 1, furthermore comprising at least one further container substantially of a same design, in addition to the first container, the inlet of which is connected to the outlet of the first container.

17. The apparatus as claimed in claim 1, furthermore comprising a sensor, which is set up in the interior or in the outlet and is adapted to carry out a fluorescence measurement or a transmission measurement in the liquid.

18. The apparatus as claimed in claim 17, wherein the at least one radiation source used for the sterilization is configured as an excitation light source for the fluorescence measurement.

* * * * *